(12) United States Patent
Ramanujan et al.

(10) Patent No.: US 8,326,767 B1
(45) Date of Patent: Dec. 4, 2012

(54) CUSTOMER DATA PRIVACY IMPLEMENTATION

(75) Inventors: Anu Ramanujan, Overland Park, KS (US); Kemi Y. Ibitayo, Overland Park, KS (US); Srinivas Pogiri, Overland Park, KS (US); Laura Haverkamp, Shawnee, KS (US); John C. Crews, Gardner, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1898 days.

(21) Appl. No.: 11/047,021

(22) Filed: Jan. 31, 2005

(51) Int. Cl.
H04L 29/00 (2006.01)
(52) U.S. Cl. ......................................................... 705/78
(58) Field of Classification Search .................. 705/78
See application file for complete search history.

(56) References Cited

U.S. PATENT DOCUMENTS

| | | | | |
|---|---|---|---|---|
| 4,727,243 A * | 2/1988 | Savar | | 705/17 |
| 4,949,251 A | 8/1990 | Griffin et al. | | |
| 6,023,684 A * | 2/2000 | Pearson | | 705/36 R |
| 6,519,571 B1 * | 2/2003 | Guheen et al. | | 705/14 |
| 6,643,650 B1 | 11/2003 | Slaughter et al. | | |
| 6,662,252 B1 | 12/2003 | Marshall et al. | | |
| 6,678,516 B2 * | 1/2004 | Nordman et al. | | 455/414.1 |
| 7,496,191 B1 | 2/2009 | Crews et al. | | |
| 2002/0052841 A1 * | 5/2002 | Guthrie et al. | | 705/40 |
| 2002/0107809 A1 * | 8/2002 | Biddle et al. | | 705/59 |
| 2002/0120547 A1 * | 8/2002 | Zajac | | 705/37 |
| 2002/0173296 A1 * | 11/2002 | Nordman et al. | | 455/414 |
| 2005/0198469 A1 * | 9/2005 | Mitchell | | 712/28 |

FOREIGN PATENT DOCUMENTS
WO WO03036900 A2 * 5/2003

OTHER PUBLICATIONS

Myles et al. ("Preserving Privacy in Environments with Location-Based Applications", Pervasive Computing, Published by the IEEE CS and IEEE Communications Society, Jan.-Mar. 2003, pp. 56-64).*
Cranor et al. ("The Platform for Privacy Preferences 1.0 (P3P1.0) Specification", W3C Recommendation Apr. 16, 2002, 94 pages).*
Stone, M. Jeffrey, et al., "Systems and Methods for Dynamic Privacy Management", U.S. Appl. No. 11/432,188, filed May 11, 2006.
Crews, John C., et al., "Integrated Privacy Rules Engine and Application," Filing Date—Dec. 17, 2003, U.S. Appl. No. 10/738,763, Specification (44 pgs.) and Drawings (4 sheets).
Fultz, David, "Rules Engine Architecture and Implementation," Filing Date—Dec. 17, 2003, U.S. Appl. No. 10/738,598, Specification (43 pgs.) and Drawings (4 sheets).
Byous, Jon, "Java Foundation Classes: Mastering Change and Productivity," The Source for Developers, 1998, 4 pgs.

(Continued)

*Primary Examiner* — James D Nigh

(57) ABSTRACT

A system for privacy management of customer data is provided. The system includes a data store, a plurality of applications, a central broker and a distributed component. The data store maintains customer privacy data used by the applications. The central broker provides the applications with customer data and manages the customer privacy data according to a set of rules regarding access to the customer privacy data. The distributed component is distributed from the central broker and is operable to communicate with the central broker to obtain at least some of the customer data. The distributed component provides at least some of the customer privacy data to the applications according to the set of rules regarding access to the customer privacy data.

21 Claims, 3 Drawing Sheets

OTHER PUBLICATIONS

Ramachandran, Vijay, "Design Patterns for Building Flexible and Maintainable J2EE Applications," The Source for Developers, Jan. 2002, 13 pgs.

Kurniawan, Budi, "How Java Web Servers Work," O'Reilly on Java.com—The Independent Source for Enterprise Java, Apr. 23, 2003, 5 pgs.

Bambookit GUI White Papers, Feb. 14, 2005, 11 pgs.

Boydstun, K., "Security Framework Data Scheme," Filed Oct. 31, 2003, U.S. Appl. No. 10/284,809, 43 pgs., Drawings (3 sheets).

Boydstun, K., "Security Framework Bridge," Filed Oct. 31, 2003, U.S. Appl. No. 10/284,680, 45 pgs., Drawings (3 sheets).

Boydstun, K., "Integrated Security Framework and Privacy Database Scheme," Filed Dec. 17, 2003, U.S. Appl. No. 10/738,244, 53 pgs., Drawings (3 sheets).

Crews, John C., et al., "Integrated Privacy Rules Engine and Application," Filed Dec. 17, 2003 U.S. Appl. No. 10/738,763, 44 pgs., Drawings (4 sheets).

Fultz, David, et al., "Rules Engine Architecture and Implementation," Filed Dec. 17, 2003, U.S. Appl. No. 10/738,598, 43 pgs., Drawings (4 sheets).

Crews, John C., et al., "Flexible Interface for Client-Side API Request Consolidation and Control," U.S. Appl. No. 11/237,216, filed Sep. 28, 2005.

Office Action dated Jul. 31, 2008 U.S. Appl. No. 11/237,216, filed Sep. 28, 2005.

Final Office Action dated Dec. 2, 2008 U.S. Appl. No. 11/237,216, filed Sep. 28, 2005.

Examiners Answer dated May 26, 2009, U.S. Appl. No. 11/237,216, filed Sep. 28, 2005.

Decision on Appeal dated Apr. 14, 2011 U.S. Appl. No. 11/237,216, filed Sep. 28, 2005.

Decision on Request for Rehearing dated Jul. 7, 2011, U.S. Appl. No. 11/237,216, filed Sep. 28, 2005.

* cited by examiner

CUSTOMER DATA PRIVACY IMPLEMENTATION

CROSS-REFERENCE TO RELATED APPLICATIONS

This application has subject-matter related to U.S. patent application Ser. No. 10/738,763, entitled Integrated Privacy Rules Engine and Application, inventors John C. Crews, David Fultz and Srinivas Pogiri, filed on Dec. 17, 2003, and to U.S. patent application Ser. No. 10/738,598, entitled Rules Engine Architecture and Implementation, inventors David Fultz, Kemi Y. Ibitayo and Anu Ramanujam, filed on Dec. 17, 2003, which are hereby incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the management of customer data. More particularly, embodiments of the present invention provide for a distributed architecture for the management of access to customer data.

BACKGROUND OF THE INVENTION

Recent advances in wireless telephony technology have included capabilities for internet access, text messaging, and the creation and transmission of digital images, among other services. These and other services can be accessed through the use of mobile, handheld, wireless telephony devices, PDAs (personal digital assistants) and other hand-held or portable devices capable of wireless calendaring and email, for example, hereinafter referred to as handsets. Some of these technologies may require that personal data pertaining to a user of a service be maintained by the provider of the service. Such customer-related data, which might include account information, credit card information, and other private information, typically needs to be kept highly secure.

SUMMARY OF THE INVENTION

A system for privacy management of customer data is provided. The system includes a data store, a plurality of applications, a central broker and a distributed component. The data store maintains customer privacy data used by the applications.

The central broker provides applications with customer data and manages the customer privacy data according to a set of rules regarding access to the customer privacy data. The distributed component is distributed from the central broker. The distributed component communicates with the central broker to obtain at least some of the customer data maintained in the data store component responsive to application requests. The distributed component implements at least some of the set of rules of the central broker regarding access to the customer privacy data while providing at least some of the customer privacy data to at least one of the applications.

An alternative embodiment provides a method for enabling a distributed customer data privacy management component. The method includes providing a framework for a distributed component operable to communicate with the central broker to obtain customer data maintained in a data store component. The distributed component provides a customer privacy data of the customer data to applications according to a set of rules regarding access to the customer privacy data. The method includes selecting to provide the distributed component distributed from the central broker. The method includes selecting a portion of the customer data including customer privacy data to store locally to the distributed component. The method also includes using the framework to enable the distributed component to manage customer data distributed from the central broker.

Another embodiment provides a distributed system for privacy management of customer data. The system includes a data store component to maintain customer data including customer privacy data, and a distributed component distributed from a central privacy management broker. The distributed component communicates with the central privacy management broker to obtain at least some of the customer data maintained in the data store component. The distributed component provides at least some of the customer privacy data to one or more applications according to rules regarding access to the customer privacy data. The system also includes a data selection and load balancing components. The data selection component communicates with the distributed component to identify a portion of the customer data to maintain locally to the distributed component. The load balancing component communicates with the distributed component to selectably load balance between servers the data requests from the distributed component to the central privacy management broker.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

Figure 1:
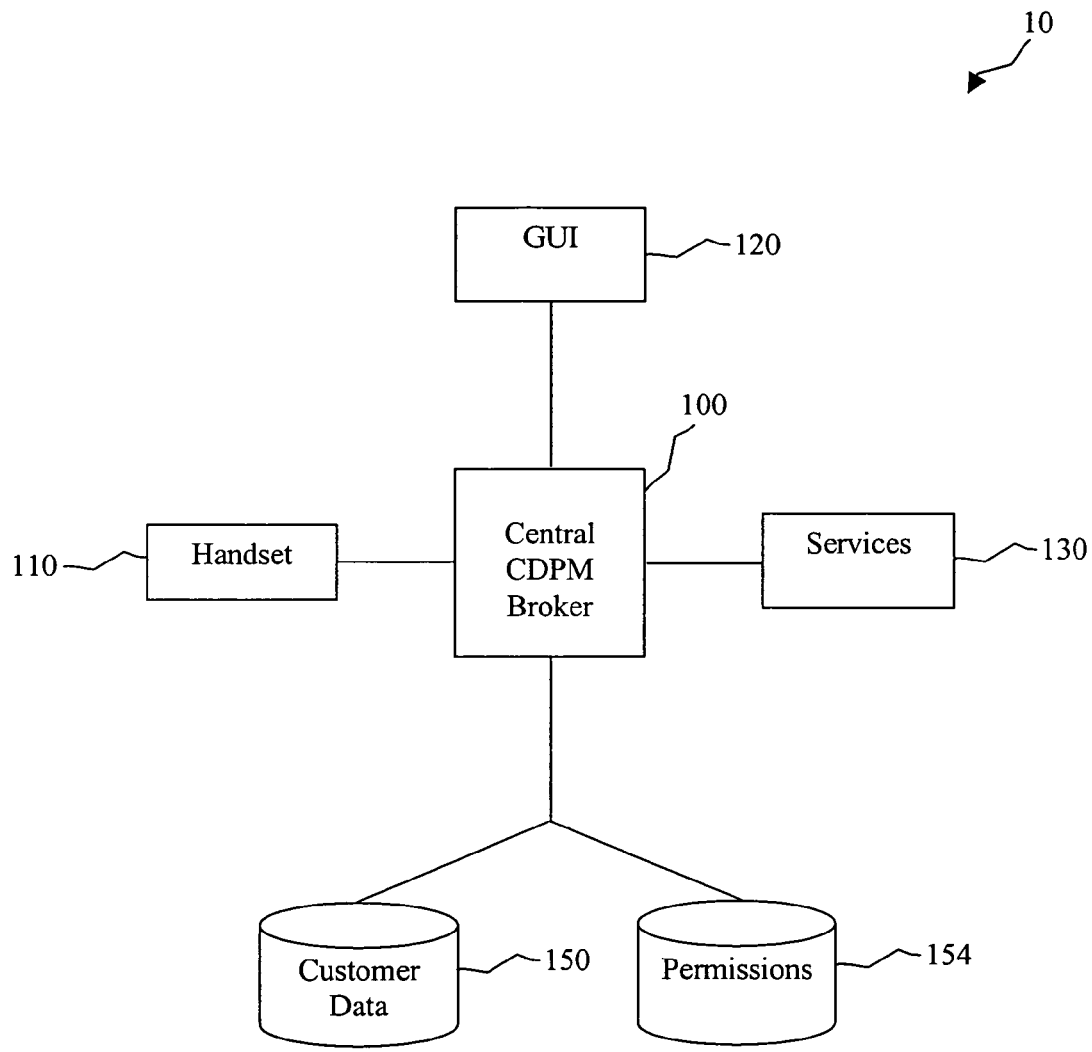
FIG. 1 is a block diagram of a centralized customer data privacy management system according to one embodiment of the present disclosure.

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

Wireless telephony technologies that have recently emerged or are proposed include push-to-talk services and location-based services. A user of a push-to-talk service can directly communicate with another user of the same service in a manner similar to communication by walkie-talkie. That is, if two users have agreed to send and receive communications with each other through a push-to-talk service, one user can simply push a button on a handset and immediately begin speaking to the other user without the need for the other user to perform any action.

Users can have personal identification numbers by means of which the users can be contacted by other users. Handsets are typically capable of maintaining within an internal memory a list of personal identification numbers of individuals with whom the owner of a handset can communicate in the push-to-talk manner. A list such as this is commonly referred to as a "buddy list". A buddy list as a whole or subsets of a buddy list also might have identification numbers by means of which one member of a group of more than two users can contact all other members of the group. By selecting a group identification number on a handset, a user can simultaneously communicate with all of the members of the group.

Location-based services are functions or features that can be customized based on the geographic location of a subscriber to a wireless telephony service. For example, a handset might be used to request a map of the vicinity of a subscriber's current location. Hardware and/or software (such as a global positioning system) within the device might have the capability to establish the latitude and longitude of its current location. A subscriber to a mapping service could use the handset to send the location to the mapping service and the service could respond with a map of the area. Another example of a location-based service might be the sending of coupons based on a customer's location. A user might wish to subscribe to a service through which discount coupons for merchandise or services are automatically transmitted to the user's handset when the user passes within a pre-defined distance of a favorite merchant or a favorite type of business.

A data store such as a relational database or a directory might be used by a service provider to store the data needed by push-to-talk services, location-based services, or other services available through a handset. For example, the identification numbers used to contact members of a buddy list might be kept in a data store for customer data. Also, a customer data store might be used to store the names of the favorite merchants of a subscriber to a location-based coupon service. Data stores that hold data used by services accessible through a handset are typically kept secure to protect private customer information. For example, a subscriber to a location-based coupon service may want a favorite merchant to know his current location, but typically would not want others to have that information. Thus, the subscriber's location would typically be kept in a secure customer data store.

A subscriber to a location-based coupon service would typically be allowed to create customized policies to specify the types of merchants that the subscriber wants to receive coupons from, how close the subscriber must be to a favorite merchant for a coupon to be sent, and other customizable features. Policies might also be used to control access to push-to-talk communication services. For example, an individual might wish to limit the people who can contact him through a buddy list. Policies such as these that implement restrictions regarding access to customer data might be embodied in software routines that can be stored in a permissions data store. This data store might be the same as or different from the data store used to store the customer data itself.

In addition to the policies individual subscribers might wish to implement to control the services they receive through handsets, other more general guidelines and regulations might restrict access to customer data. For example, companies that provide services through handsets would typically need to maintain private information about their customers, including account information, billing information, credit card information, and other sensitive data. Such companies might enter into agreements with customers on how private customer data is to be used and protected. To fulfill the agreements, the companies might implement internal policies that require that such information be kept in a secure data store and that specify which entities are allowed access to which elements of private customer data.

Government regulations and other legal requirements might also specify how private customer data is to be maintained. For example, in a document entitled "Fair Information Practices in the Electronic Marketplace", the Federal Trade Commission (FTC) has set forth the four guiding privacy principles of notice, choice, access, and security. The FTC also enforces the Children's Online Privacy Protection Act (COPPA) as well as numerous consumer protection laws. The FTC also enforces the Gramm-Leach-Bliley Act, which places privacy obligations on entities dealing with certain types of consumer financial information. The Federal Communications Commission (FCC), under the Telecommunications Act, regulates Customer Proprietary Network Information, including customer usage data and location information. The Department of Health and Human Services enforces certain statutes, such as the Health Insurance Portability and Privacy Act, which place privacy and security obligations not only on health care providers but also on companies that have business relationships with health care providers.

Any enterprise that collects private customer data would typically need to implement policies that ensure compliance with all of these various restrictions. These policies can be embodied in software routines that automatically enforce the restrictions whenever any attempt to retrieve private customer data is made. The regulations, guidelines, policies, customer preferences, and other restrictions that limit access to private customer data can be referred to generically as privacy constraints. A software routine that implements a privacy constraint can be referred to as a privacy rule. Each data element in a data store of customer data typically has one or more privacy rules associated with it describing the constraints on access to the data element.

The present disclosure is not the privacy policy or system for implementing customer data privacy of any particular organization and should not be relied on by any customer with regard to protection of the customer's personal information. Further, the present disclosure should not be relied on for satisfying any legal requirements regarding consumer or customer data privacy protection, nor should anything in this disclosure be considered the opinion, interpretation, or recommendation for implementation of customer data privacy by or for any organization or company. The present disclosure is merely illustrative of one type of system that could be employed by an organization for these purposes.

An enterprise might use a customer data privacy management system to implement the privacy rules and protect private customer data. A block diagram of such a customer data privacy management (CDPM) system is shown in FIG. 1. A central CDPM broker 100 brokers the flow of information through the customer data privacy management system 10. Information can be entered into and retrieved from the CDPM broker 100 through a handset 110 or through a graphical user interface (GUI) 120, such as the GUI that might appear on the monitor of a computer workstation. For example, a user might retrieve buddy list information from the handset 110 or an administrator might enter buddy list information via the GUI 120. Only one handset 110 is shown in FIG. 1 but it should be understood that multiple handsets could simultaneously connect to the CDPM broker 100 and the single handset 110 is intended to represent a plurality of handsets.

A set of wireless telephony services 130 is available to users of the CDPM system 10. The services 130 might include a push-to-talk service, a location-based service, a digital imaging service, an internet access service, a text messaging service, a gaming service, a ringtone service, a personalized web page service, or other services. These services can also be referred to as applications or, alternatively, the applications can be thought of as the providers of the services. Other systems, services, and programs may also be employed and used for the present purposes, such as bill insert coupons and other third-party promotion and partnering arrangements. While only a single block 130 is shown in FIG. 1 to represent these services, it should be understood that any number and any combination of services could be available.

Data used by the handsets 110, the GUI 120, and the wireless telephony or other services 130 is stored in a data store for customer data 150 and a permissions data store 154. The customer data store 150 might contain private customer information such as account information or credit card information as well as less secure data such as buddy list information.

The permissions data store 154 contains privacy rules regarding how the data in the customer data store 150 is to be managed. These rules implement the various government regulations, company policies, and customer preferences that restrict access to private customer data. For example, the permissions data store 154 might contain privacy rules regarding which merchants have permission to send coupons to which subscribers of location-based coupon services. The permissions data store 154 might also contain privacy rules regarding which members of a group can add themselves to a user's buddy list, who can access information about a member of a group, or who is allowed to create other rules regarding buddy lists. Privacy rules that implement the FTC's fair information practices and other legal guidelines might also be stored in the permissions data store 154.

The data stores 150 and 154 could be relational databases or could be directories compliant with a directory protocol such as the Lightweight Directory Access Protocol (LDAP) or its successors. Also, while the customer data store 150 and the permissions data store 154 are shown as separate components, customer data and permissions data could be maintained in a single data store or on multiple other data stores. Buddy list information, customer information, and other information in the customer data store 150 is not accessed directly by the handsets 110, the GUI 120, or the wireless telephony services 130, but is accessed through the CDPM broker 100.

Changes to buddy list data made in the customer data store 150 via the GUI 120 typically need to be transferred to the handsets 110 in order to be available to the users of the handsets 110. Similarly, changes made to a buddy list in a handset 110 typically need to be transferred to the customer data store 150. The CDPM broker 100 transfers data between the handsets 110 and the customer data store 150.

For the sake of clarity in the drawing, several components in the CDPM system 10 have been omitted from FIG. 1. For example, security systems would typically be present between the components to ensure that access from one component to another is authorized. For instance, a user using the GUI 120 would typically be required to pass through a security layer before being granted access to the CDPM broker 100. A service 130 attempting to retrieve customer data might be authenticated before being granted access to the customer data store 150. Also, interfaces and network connections among the components and external services or applications that might be needed by the wireless telephony services 130 are not shown. For instance, a handset 110 would typically not access the CDPM broker 100 directly, but might connect to the CDPM broker 100 through a network, such as the internet.

FIG. 1 depicts a single, central CDPM broker 100. In an embodiment, a portion of the functions of the CDPM broker 100 or of the overall CDPM system 10 could be distributed to multiple local instances of a CDPM broker. A distributed architecture could make a CDPM system faster and more reliable. For example, if a network failure or a failure of the central CDPM broker 100 should occur, a user might still be able to gain access to customer data through a local CDPM broker client. Also, retrieval of data from a local CDPM client might be faster than retrieval from the central CDPM broker 100.

Figure 2:
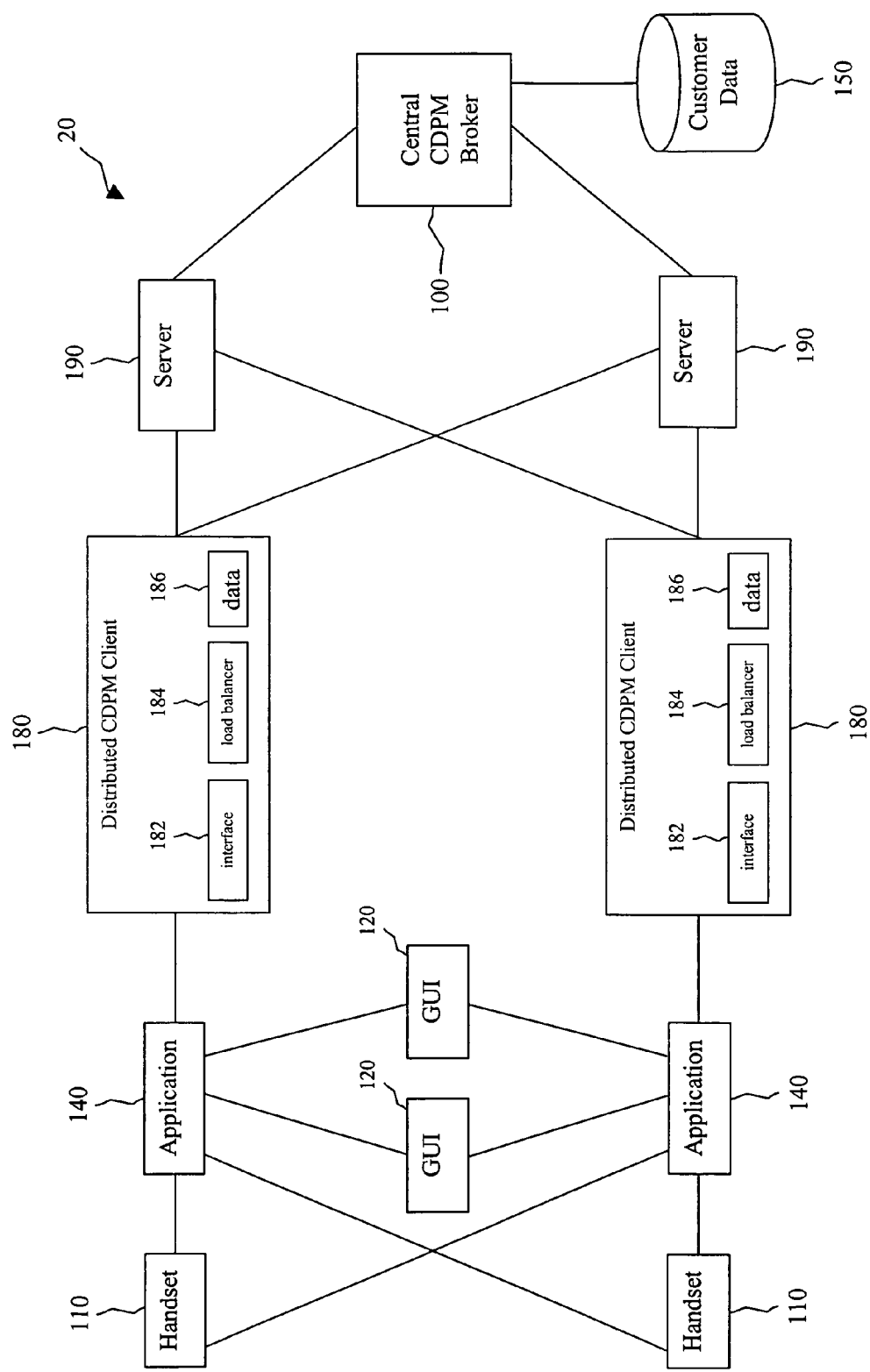
FIG. 2 is a block diagram of a distributed customer data privacy management system according to another embodiment of the present disclosure.

FIG. 2 depicts a CDPM system 20 that uses a distributed architecture. As in FIG. 1, the central CDPM broker 100, the plurality of handsets 110, the plurality of GUIs 120, and the customer data store 150 are present. In the embodiment of FIG. 2, a plurality of distributed CDPM clients 180 are also present. While two handsets 110, two GUIs 120, and two distributed CDPM clients 180 are shown, it should be understood that other numbers could be present. Also, the set of wireless telephony services 130 and the permissions data store 154 are not shown but should be understood to be present. Security systems, external applications, interfaces, network connections, and other components have again been omitted from the drawing for simplicity and ease of understanding.

In an embodiment, each distributed CDPM client 180 may be installed locally on a workstation computer that has access to a plurality of applications 140. The applications 140 might be the services 130 described in connection with FIG. 1 or might be other applications that have a need to gain access to data or services via the central CDPM broker 100. For each application 140, a customized distributed CDPM client 180 might be created that provides the application 140 with local access to data or services that might otherwise require going through the central CDPM broker 100.

A general distributed CDPM client 180 framework or template might be provided to a user of an application 140 that allows the user to select the features desired for a specific distributed CDPM client 180. When the features have been selected, a customized instance of a distributed CDPM client 180 is created and can be installed on the workstation. Thereafter, when an application 140 needs to access data or services that previously required going through the central CDPM broker 100, the application 140 can instead access the data or services through the local distributed CDPM client 180. In this manner, the framework allows the distributed CDPM client 180 to be readily customized by the application developer to provide a variety of different functionality to address the specific needs of the user, application, operating system, and/or architecture.

A user of an application 140 might access the application 140 through a GUI 120 on the workstation or through a handset 110. In an alternative embodiment, an application 140, a distributed CDPM client 180, or both might be installed on a handset 110 rather than on a workstation computer.

In various embodiments, the distributed CDPM clients 180 perform all or a portion of the functions that might otherwise be performed by the CDPM broker 100 or by the overall CDPM system 10. For example, data 186, such as customer data, buddy list data, or other information, might be stored locally on the distributed CDPM clients 180. Storing the data 186 locally might provide faster access to the data 186 and might allow access to the data when access to the central CDPM broker 100 cannot be gained.

In one embodiment, the data 186 might be a temporary cache containing a portion of the data stored in the customer data store 150. In this case, data 186 that is used frequently might be cached on the distributed CDPM clients 180 while less frequently used data might be stored in the customer data store 150. For example, after a user logs in to a secure application for the first time, authentication data for that user might be cached so that, upon subsequent logins, re-entry of a password or other authenticating information is not necessary.

In another embodiment, the data 186 on each distributed CDPM client 180 might be a replication of the entire customer data store 150. Such an arrangement might allow a greater amount of data to be stored locally in the distributed CDPM clients 180 but might require additional licensing from the vendor of the software used by the customer data store 150. A combination of data caching and data replication might also be used.

Numerous different communication protocols might be employed by the applications 140. For example, hypertext transfer protocol (http), Enterprise Java Beans (EJB), Java Messaging Service (JMS), WebServices, or other communication protocols might be used. In an embodiment, a generic communication layer/interface 182 is present to allow the applications 140 to communicate with the distributed CDPM clients 180 using various protocols. The communication interface 182 can accept input from the applications 140 in any format typically used by the applications 140 and can translate the input into a format readable by the distributed CDPM clients 180. Likewise, the communication interface 182 can accept input from the distributed CDPM clients 180 and translate the input into any format commonly used by the applications 140. This allows multiple types of applications 140 to communicate with the distributed CDPM clients 180 without the need for a specified communication protocol or the need for customized modifications to the applications 140 or the distributed CDPM clients 180. New communication protocols can easily be plugged in without affecting existing CDPM clients 180. When EJB is used, any EJB implementation, RMI-IIOP/T3 for example, can be chosen.

Alternatively, rather than the interface 182 automatically translating communications between an application 140 and a CDPM client 180 from one format to another, a user of an application 140 might choose the communication protocol to be used. That is, when a framework or a template as described above is used to create a customized instance of a CDPM client 180, a user can specify the communication protocol the CDPM client 180 will follow.

When an application 140 requests data or services that are available locally on a distributed CDPM client 180, the distributed CDPM client 180 can provide the data or services without the need for communication with the central CDPM broker 100. However, if data or services that are not available locally are requested, the data or services would typically need to be retrieved via the central CDPM 100 in the manner described in connection with FIG. 1. In an embodiment, the distributed CDPM clients 180 might have access to a plurality of server computers 190 through which the distributed CDPM clients 180 can reach the central CDPM broker 100. That is, instead of the distributed CDPM clients 180 communicating directly with the central CDPM broker 100, requests for data or services are sent to the central CDPM broker 100 via a server 190. Replies to the requests also pass through a server 190.

In an embodiment, each distributed CDPM client 180 can have a component 184 that is selectable for software-based load balancing and server 190 request failover. That is, when multiple requests for data or services are sent from the distributed CDPM clients 180 to the servers 190, the load balancing components 184 distribute the requests among the servers 190 so that each server 190 performs approximately the same amount of work. Also, if a server 190 becomes inoperative or inaccessible, the load balancing components 184 ensure that data requests are not sent to that server 190.

In various embodiments, various amounts of processing of the requests received from the applications 140 are performed by the distributed CDPM clients 180 and various amounts are performed by the central CDPM broker 100. That is, in one embodiment, only a minimal amount of processing is done by the distributed CDPM clients 180 and almost all of the processing is done by the central CDPM broker 100. In another embodiment, almost all of the processing is done by the distributed CDPM clients 180 and only a minimal amount is done by the central CDPM broker 100. In other embodiments, the processing is divided between the distributed CDPM clients 180 and the central CDPM broker 100 in other ratios between these two extremes.

When the distributed CDPM clients 180 send requests or portions of requests (via the servers 190) to the central CDPM broker 100 for processing, the transmission can be carried out in either a parallel or a batch manner. That is, each distributed CDPM client 180 might send a request to the central CDPM broker 100 upon completion of any processing that it has done. In this case, a relatively small number of requests would arrive at the central CDPM broker 100 over a relatively long period of time. Alternatively, the distributed CDPM clients 180 might hold their requests temporarily and then periodically send a single batch of requests to the central CDPM broker 100. In this case, a relatively large number of requests would arrive at the central CDPM broker 100 over a relatively short period of time. In an embodiment, an administrator of the CDPM system 20 can select whether the distributed CDPM clients 180 send requests in parallel or in a batch. In other embodiments, designers or implementers of the distributed CDPM client 180 framework may select whether the transmissions will include instructions or messages instructing the central CDPM broker 100 to process the requests in parallel, batch, serially, or otherwise.

The CDPM client 180 framework or template may allow the developers/users to select the request delivery features. For example, the template developer may select that requests be sent from the CDPM client 180 to the CDPM broker 100 in batch, and that the CDPM broker 100 process them in parallel and return them in batch or otherwise. The template is further operable for the user to select the appropriate action on failed requests and/or transactions. For example, the developer may select whether to continue processing the remaining requests or return all unprocessed requests when one of the requests in the batch fails. Other settings and options for handling requests will readily suggest themselves to one skilled in the art.

When the central CDPM broker 100 receives a large number of requests in a short period of time, it might not be able to process the requests as a batch. Instead, the central CDPM broker 100 might separate the batch into smaller units and process multiple units in a parallel manner. When processing is complete, the central CDPM broker 100 might return the processed units to the distributed CDPM clients 180 in a parallel manner or might aggregate the processed units into a batch and return the batch to the distributed CDPM clients 180.

In an embodiment, the distributed CDPM clients 180 can temporarily hold portions of data retrieved from the central CDPM broker 100 in order to present the data in an easily managed format on a handset 110 display. For example, a user might use a handset 110 to request a search of the data in the customer data store 150. If the data set that meets the parameters of the search is large, the limited memory capacity typically found on handsets 110 might not be sufficient to hold the entire data set. Even if the entire data set can be transferred to a handset 110, the data set might be too large for a user to conveniently peruse.

In an embodiment, the data set or a portion of the data set is sent to a distributed CDPM client 180. A portion of the data set can then be transferred from the distributed CDPM client 180 to the handset 110. The size of the transfer to the handset 110 might be set by an administrator of the CDPM system 20 or might be specified by the user of the handset 110 or the framework implementer. The user might inspect the transferred data to determine if a desired piece of information is present. If it is not, the user might request the next set or portion of data of the predefined size. This process of the user requesting and inspecting portions of a larger data set can continue until the user finds the desired information.

As an example, a user might want the telephone number for a particular person whose last name is known, but about whom little other information is known. The user might use the handset 110 to request that information about all persons in the customer data store 150 with that last name be displayed on the handset 110. The user might then search the display to attempt to find the desired person. In an embodiment, the user might request that only a small amount of information be displayed at a time. If the desired person is not found in the first set of information, another set of a similar size could be requested, and so on until the desired person is found.

In one embodiment, the customer data store 150 is searched one time and the entire data set that meets the specified parameters is sent to and cached in a distributed CDPM client 180. A portion of this cache could then be sent to a handset 110 when requested by a user. If the user requests another portion of the cache, a new portion that begins where the previous portion ended can be sent from the distributed CDPM client 180 to the handset 110.

In an alternative embodiment, the customer data store 150 is searched until a data set that is the specified size is created. The size may be specified in the template used to generate the CDPM client 180, for example. This data set is then sent to a distributed CDPM client 180 and from the distributed CDPM client 180 to a handset 110. If the user requests another set of data, the search of the customer data store 150 resumes at the point where it left off and continues until another data set of the specified size is created. This data set is then transferred to the handset 110 via the distributed CDPM client 180. This process can continue until the user finds the desired piece of data.

In either method for transferring data to the handset 110, the transfer of cached data or of data from the central data store 150 can be done without any resources being used to record the state where the previous transfer of data ended and the next transfer should begin. This can be accomplished by the CDPM client 180 sorting the data based on a primary key and retrieving the data using an SQL rownum query. The CDPM client 180 passes in the fetch size and the largest primary key for retrieval purposes. This type of search provides the CDPM client 180 with an ID indicating where the search ended. The CDPM client then passes this ID as a parameter to the request for the next set of data which causes the search to pick-up where it left off. This process may then be continued until the end of the data in the scope of the original request.

In the distributed CDPM system 20, reading of data from the system 20 typically occurs on a local basis from one of the distributed CDPM clients 180. Writing of data to the system 20 typically occurs to the central data store 150. Periodic transfers of data can be made from the central data store 150 to the distributed CDPM clients 180 to keep the local data in the distributed CDPM clients 180 synchronized with the data in the central data store 150.

As mentioned above, a specific instance of a distributed CDPM client 180 can be created through the selection of features presented in a general distributed CDPM client 180 framework or template. In light of the previous discussion, it can now be stated more specifically that the features that might be selected can include one or more of the following: the type of data 186 to be maintained locally on the distributed CDPM client 180; the type of services to be maintained locally on the distributed CDPM client 180; the manner of local data storage (i.e., caching or replication); the manner of request processing (i.e., parallel or batch); the manner of transferring large data sets to a handset 110; the size of the data sets transferred to a handset 110; the attributes of the interface 182 and the load balancer 184; and other features and attributes as discussed herein.

Figure 3:
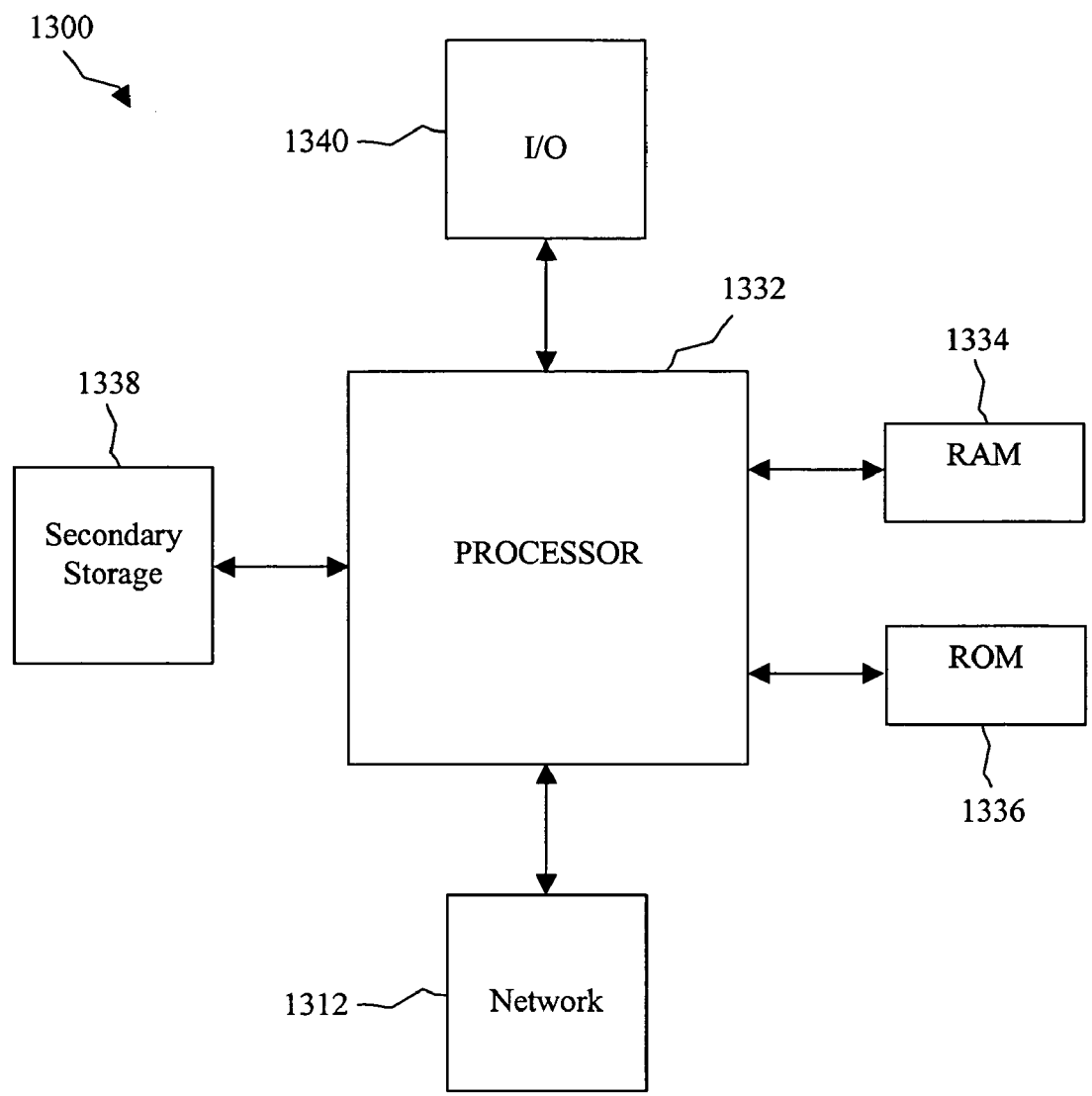
FIG. 3 is a block diagram of a computer system operable for implementing some of the various embodiments of the present disclosure.

A data structure for a customer data privacy implementation as described above may generally be implemented on a variety of different computer systems. FIG. 3 illustrates a typical, general-purpose computer system suitable for implementing the present invention. The computer system 1300 includes a processor 1332 (also referred to as a central processing unit or CPU) that is coupled to memory devices including primary storage devices 1336 (typically a read only memory, or ROM) and primary storage devices 1334 (typically a random access memory or RAM).

As is well known in the art, ROM acts to transfer data and instructions uni-directionally to CPU 1332, while RAM is used typically to transfer data and instructions in a bi-directional manner. Both storage devices 1334 and 1336 may include any suitable computer-readable media. A secondary storage medium 1338, which is typically a mass memory device, is also coupled bi-directionally to CPU 1332 and provides additional data storage capacity. The mass memory device 1338 is a computer-readable medium that may be used to store programs including computer code, data, and the like. Typically, mass memory device 1338 is a storage medium such as a non-volatile memory such as a hard disk or a tape which is generally slower than primary storage devices 1334 and 1336. Mass memory storage device 1338 may take the form of a magnetic or paper tape reader or some other well-known device. It will be appreciated that the information retained within the mass memory device 1338 may, in appropriate cases, be incorporated in standard fashion as part of RAM 1334 as virtual memory. A specific primary storage device 1334 such as a CD-ROM may also pass data uni-directionally to the CPU 1332.

CPU 1332 is also coupled to one or more input/output devices 1340 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1332 optionally may be coupled to a computer or telecommunications network, e.g., an internet network, or an intranet network, using a network connection as shown generally at 1312. With such a network connection, it is contemplated that CPU 1332 might receive information from the network, or might output information to the network in the course of performing the above-described method steps. Such information, which is often represented as a sequence of instructions to be executed using CPU 1332, may be received from and outputted to the network, for example, in the form of a computer data signal embodied in a carrier wave. The above-described devices and materials will be familiar to those of skill in the computer hardware and software arts.

In one embodiment, sequences of instructions may be executed substantially simultaneously on multiple CPUs, as for example a CPU in communication across network connections. Specifically, the above-described method steps may be performed across a computer network. Additionally, it will be recognized by one of skill in the art that the above method steps may be recognized as sets of computer codes and that such computer codes are typically stored in computer readable media such as RAM, ROM, hard discs, floppy discs, carrier waves, and the like.

While several embodiments have been provided in the present disclosure, it should be understood that the Customer Data Privacy Implementation may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each but may still be indirectly coupled and in communication, whether electrically, mechanically, or otherwise, with one another. Other examples of changes, substitutions, and alterations are ascertainable by one skilled in the art and could be made without departing from the spirit and scope disclosed herein.

What is claimed is:

1. A system for privacy management of customer data comprising:
 a computer readable storage medium comprising a central broker encoded with computer-executable instructions when executed by a computer causes the central broker to provide customer data including customer privacy data from a data store component in response to a request for the customer data, and to provide the customer data according to a set of rules regarding access to the customer privacy data; and
 a computer readable storage medium comprising a distributed component, the distributed component distributed from the central broker, installed on a customer device, and encoded with computer-executable instructions when executed by the customer device causes the distributed component to receive the request for the customer data from at least one application installed on the customer device, determine whether a copy of the customer data is stored on the distributed component, provide the copy of the customer data to the at least one application according to the set of rules regarding access to the customer privacy data in response to a determination that the copy of the customer data is stored on the distributed component, request the customer data from the central broker in response to a determination that the copy of the customer data is not stored on the distributed component, receive the customer data from the central broker in response to requesting the customer data from the central broker, provide the customer data to the at least one application according to the set of rules, and copy the customer data to the distributed component in response to receiving the customer data from the central broker.

2. The system of claim 1, wherein at least some of the customer privacy data obtained from the central broker stored in the data store component is stored in a temporary cache distributed from the central broker.

3. The system of claim 2, wherein the distributed component and the at least some of the customer privacy data stored in the temporary cache are located on a first computer system and the central broker is provided on a second computer system.

4. The system of claim 2, wherein the at least some of the customer privacy data obtained by the distributed component is stored in a replication of the customer privacy data in the data store component.

5. The system of claim 1, further comprising an interface component in the distributed component that translates communications between the at least one application and the distributed component.

6. The system of claim 5, wherein the interface component communicates with the at least one application using one of a hypertext transfer protocol and Enterprise Java Beans.

7. The system of claim 1, further comprising a load balancing component of the distributed component that distributes a plurality of data requests received by the distributed component from the at least one application between a plurality of servers to balance work between the plurality of servers.

8. The system of claim 7, wherein the load balancing component refrains from sending data request to an inoperable one of the plurality of the servers.

9. The system of claim 7, wherein the distributed component sends the plurality of data requests to at least one of the plurality of servers in one of a parallel manner and a batch manner.

10. The system of claim 9, wherein the central broker sends replies to the plurality of data requests in one of a parallel manner and a batch manner.

11. The system of claim 1, wherein a portion of the at least some of the customer privacy data obtained by the distributed component is temporarily maintained by the distributed component for subsequent display by one of a mobile telecommunications handset and a workstation computer when requested by a user of one of the mobile telecommunications handset and the workstation computer.

12. The system of claim 1, wherein the customer device is one of a mobile telecommunications handset and a workstation computer.

13. A method for enabling a distributed customer data privacy management component, the method comprising:

providing a distributed component that communicates with a central broker and obtains customer data maintained in a data store component, wherein the customer data includes customer privacy data, and wherein the central broker provides the customer data to at least one application installed on a customer device according to a set of rules regarding access to the customer privacy data;

selectively distributing the distributed component from the central broker to the customer device and installing the distributed component on the customer device;

receiving, by the distributed component, a request for the customer data from the at least one application;

determining, by the distributed component, whether a copy of the customer data is stored on the distributed component;

providing, by the distributed component, the copy of the customer data to the at least one application according to the set of rules in response to a determination that the copy of the customer data is stored on the distributed component;

requesting, by the distributed component, the customer data from the central broker in response to a determination that the copy of the customer data is not stored on the distributed component;

receiving, by the distributed component, the customer data from the central broker in response to requesting the customer data from the central broker;

providing, by the distributed component, the customer data to the at least one application according to the set of rules in response to receiving the customer data from the central broker; and selecting a portion of the customer data including the customer privacy data to cache locally to the distributed component in response to receiving the customer data from the central broker.

14. The method of claim 13, further comprising selecting whether to provide requests for data from the distributed component to the central broker in one of a serial manner and batch manner.

15. The method of claim 13, further comprising selecting whether the central broker processes the requests from the distributed component in one of a parallel manner or batch manner.

16. The method of claim 13, further comprising selecting whether to load balance requests for data from the distributed component between servers.

17. A distributed system for privacy management of customer data comprising:

a computer readable storage medium comprising a central broker encoded with computer-executable instructions when executed by a processor computer causes the central broker to provide customer data including customer privacy data from a data store component in response to a request for the customer data, and to provide the customer data according to a set of rules regarding access to the customer privacy data;

a computer readable storage medium comprising a distributed component encoded with computer-executable instructions, when distributed from the central broker, installed on a customer device, and executed by the customer device causes the distributed component to receive the request from at least one application installed on the customer device, determine whether a copy of the customer data is stored on the distributed component, provide the copy of the customer data to the at least one application according to the set of rules in response to a determination that the copy of the customer data is stored on the distributed component, request the customer data from the central broker in response to a determination that the copy of the customer data is not stored on the distributed component, receive the customer data from the central broker in response to requesting the customer data from the central broker, and provide the customer data to the at least one application according to the set of rules regarding access to the customer privacy data in response to receiving the customer data from the central broker;

a computer readable storage medium comprising a data selection component encoded with computer-executable instructions when executed by the customer device causes the data selection component to communicate with the distributed component and receive user selections that identify one of a portion of the customer data, a replication of an entire customer data, and a combination thereof of the customer data to maintain locally to the distributed component in response to receiving the customer data from the central broker; and a computer readable storage medium comprising a load balancing component encoded with computer-executable instructions when executed by the customer device causes the load balancing component to communicate with the distributed component to selectably load balance between servers requests for data from the distributed component to the central broker.

18. The distributed system of claim 17, further comprising:
a first processing component that communicates with the distributed component to promote processing of the requests for data by the distributed component in a batch manner.

19. The distributed system of claim 17, further comprising:
a first selectable processing component that promotes batch processing of replies by the central broker of the requests for data by the distributed component.

20. The distributed system of claim 17, further comprising:
a first selectable processing component that promotes parallel processing of replies by the central broker of the requests for data by the distributed component.

21. The distributed system of claim 17, further comprising:
a search component portion of the distributed component that requests a group of records of customer data and receives an identifier based with a requested first group of records of customer data, wherein the search component portion uses the identifier to submit with a request for a second group of records of customer data, the identifier used to determine a beginning of the second group of customer records to be sent to the distributed component.

* * * * *